Oct. 14, 1930.  D. C. PEDERSEN  1,778,334
ENGINE DRIVEN ROTARY CULTIVATOR
Filed July 31, 1928  3 Sheets-Sheet 1

INVENTOR:
Dines Christian Pedersen
BY: Kueg, Boyce & Batelor
ATTORNEYS.

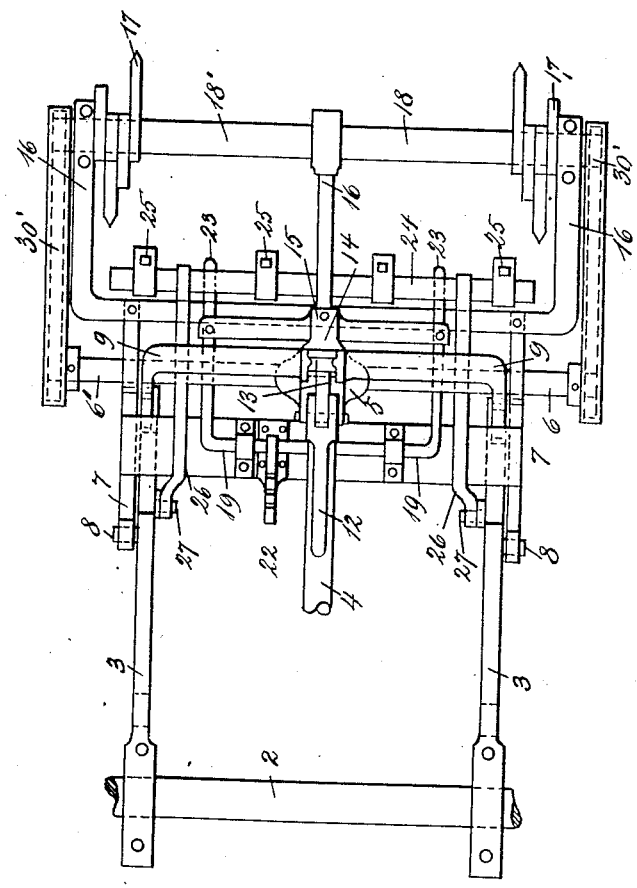

Oct. 14, 1930.  D. C. PEDERSEN  1,778,334
ENGINE DRIVEN ROTARY CULTIVATOR
Filed July 31, 1928  3 Sheets-Sheet 3
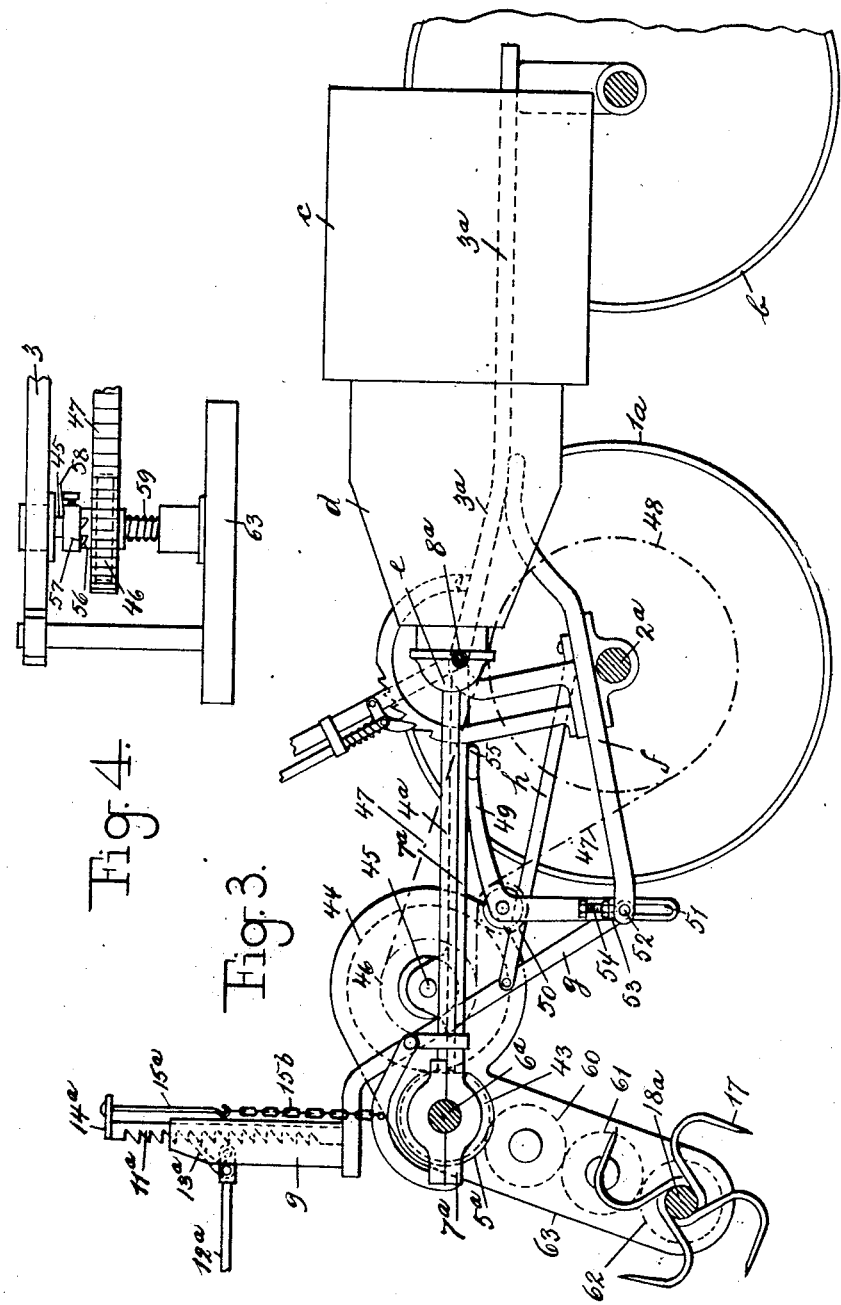
INVENTOR:
Dines Christian Pedersen
BY King, Boyer & Bakeler
ATTORNEYS.

Patented Oct. 14, 1930

1,778,334

UNITED STATES PATENT OFFICE

DINES CHRISTIAN PEDERSEN, OF HOLBEK, DENMARK

ENGINE-DRIVEN ROTARY CULTIVATOR

Application filed July 31, 1928, Serial No. 296,491, and in Denmark August 4, 1927.

This invention relates to cultivators and has special reference to a cultivator employing power driven rotary earth working tools.

In cultivators having a power driven shaft on which is mounted a series of earth working tools it frequently happens that one of the tools, or a blade of such tool, will strike a stone, stump or other hard object in the ground. The tool, being power driven, will be subject to damage under these conditions.

One important object of the invention is, therefore, to provide an improved form of cultivator wherein engagement of a tool of the kind described with a hard object may result in stoppage of movement of that tool without affecting the operation of other tools or damage to any of the parts.

A second important object of the invention is to provide a differentially driven sectional tool shaft in such a cultivator.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 2 is a plan view thereof.

Figure 3 is a view similar to Figure 1 but showing a modification of the device wherein the cultivator is built as a unit having its own motive power.

Figure 4 is a detail of a portion of the drive in the modified form.

Figure 1:
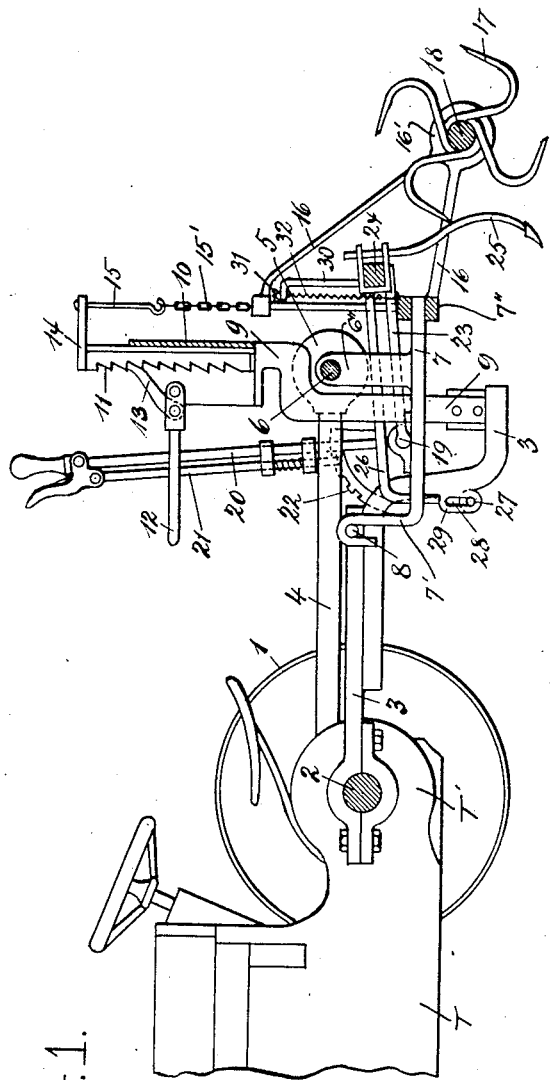
Figure 1 is a side elevation of one form of the invention as constructed for attachment to a tractor.

In the form of the invention shown in Figures 1 and 2 there is disclosed in Figure 1 the rear end of a tractor T, this rear end being supported on wheels which are mounted on an axle 2. Mounted also on the axle 2 is a main frame 3 provided with ground engaging shoes or feet 3'. Leading from the gear housing T' of the tractor is a torque tube 4 which extends back to the differential housing 5, there being the usual drive shaft in the tube 4 and differential gearing in the housing 5 though these are not deemed necessary here to be shown. This differential gearing drives the usual differential shaft having the sections 6 and 6' and these sections are journaled in bearing standards 6" mounted on a supplemental frame 7 having at its forward end on each side a goose-neck 7' which hooks over a pivot pin 8 mounted on the fixed frame 3. The frame 7 has toward the rear a transverse portion 7". Extending upwardly from the shoes 3' is a guide frame 9 carrying centrally a vertical guide 10 wherein is slidably mounted a rack bar 11. Pivoted to the frame 9 adjacent the rack bar 11 is a lever 12 which carries a pawl 13 engaging the rack bar so that lifting the lever raises the rack bar. Extending rearwardly from the top of the rack bar 11 is a member 14 carrying at its rear end a hook 15 which engages a chain 15' attached to a portion of the supplementary or movable frame 7. Extending rearwardly at each side of the movable frame are bracket members 16 which carry at their rear ends journals 16' wherein is journaled a two part or bisectional shaft, the parts of which are indicated at 18 and 18'. On this shaft are fixed sets of earth working tools 17 in the form of claws or hooks so that, as the shaft sections are rotated these tools dig into the ground and loosen the same. Extending across the supplementary frame and supported in suitable bearings thereon is a shaft 19 from which extends upwardly a latch lever 20 carrying a latch 21 working over a quadrant 22 fixed to the frame 7. Extending rearwardly from the shaft 19 is a pair of arms 23 which support at their rear ends a cross bar 24 carrying earth working tools such as 25. Also, there extends forwardly from the bar 24 a pair of arms 26 which terminate in outwardly bent journal portions 27 mounted in slots 28 formed in lugs 29 on the main frame just above the shoes 3'. On the cross member 7" is an upstanding bracket 30 which carries the upper end of a spring 32 having its lower end connected to the respective arm 23, the spring being adjustable for tension by the wing nut 31. Thus the tools 25 are allowed adjustment by moving the latch lever 20 so that these tools may be raised or lowered with respect to the tools 17 and independently thereof. Chain belts 30' connect the shaft sections 6 and 6' with the shaft sections 18 and 18'.

Under these circumstances it will be seen that the differential gearing in the casing 5 drives the shaft sections 6, 6' so that they may have differential movement and thus the sections 18, 18' may likewise have differential movement so that if a tool of one set strikes an immovable object in the ground that set will come to rest without danger to the tool or any of the parts, the differential gearing permitting this while speeding up the tool on the opposite side.

In the form of the invention shown in Figures 3 and 4 the device is arranged as part of a motor vehicle having a fixed frame $3^a$ supported on rear wheels $1^a$ and front wheels $b$, the front housing of the operating mechanism or engine being shown at $c$ and the rear housing at $d$. Also, at $e$ is a gear housing for gearing the driving shaft, not shown, which is located in the torque tube $4^a$ to the engine. This torque tube extends backwardly in the usual manner to differential gearing not shown, contained in the housing $5^a$ and driving differential shaft sections $6^a$. The frame $3^a$ has a lower member $f$ supported on the shaft 2 and extending upwardly and rearwardly of the main frame are struts $g$ held in position by braces $h$. On top of these struts is mounted a guide $9^a$ wherein slides a ratchet bar $11^a$ operated by a lever $12^a$ and pawl $13^a$ as before. Similarly, there is provided at the top of the ratchet bar $11^a$ a lateral extension $14^a$ carrying a hook $15^a$ which in turn supports a chain $15^b$ attached to a portion of the movable frame $7^a$, this frame being pivoted at its forward end on pivots $8^a$. On each section of the shaft $6^a$ is a gear 43 which meshes with a gear 44 mounted on a shaft 45 and carrying a sprocket 46 which is connected by a suitable chain 47 with a sprocket 48 driving a respective wheel $1^a$. At 49 is a frame member supporting an idler wheel 50 for tightening the belt 47. This frame member has a vertical leg provided with a slot 51 engaging a pin or shaft 52 carried by the frame member $f$. Also, the vertical portion of the frame member 49 is provided with a lug 53 normally resting on the frame member $f$. A screw 54 passes through this lug and by means of the screw the belt 47 may be tightened, the screwing down of the screw serving to lift the frame 49 and wheel 50. Also, the frame member 49 is provided with lateral lugs 55 engaging beneath the frame 7. From an inspection of Figure 4 it will be seen that the sprocket 46 is provided with a bevel toothed clutch 56 engaging a corresponding clutch member 57 formed on a collar 58, the latter being fixed on the shaft 45 of the clutch members being held normally in engagement by the spring 59. Also the gear 43 meshes with a gear 60 and this in turn with a gear 61, the latter meshing with a gear 62 on one of the shaft sections $18^a$, a gear casing 63 being provided for the journaling of these several gears.

In the operation of this form of the device the effect is the same as in the previous form, one shaft section $18^a$ being capable of having its motion arrested without injury to the parts.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:—

1. An engine driven rotary cultivator including a main frame supported to remain at a fixed distance from the ground, a movable secondary frame carried by the main frame and supported thereby to permit relative movement toward and from the ground, an engine driven drive shaft, a differential gearing driven by said drive shaft and carried by said secondary frame, a sectional differential shaft driven by said gearing and having its sections connected to the gearing for differential movement, and cultivator tools independently driven by said sections to revolve therewith whereby the tools driven by one shaft section may operate differentially to the tools driven by the other section.

2. An engine driven rotary cultivator including a main frame supported to remain at a fixed distance from the ground, a movable secondary frame carried by the main frame and supported thereby to permit relative movement toward and from the ground, an engine driven drive shaft, a differential gearing driven by said drive shaft and carried by said secondary frame, a sectional differential shaft driven by said gearing and having its sections connected to the gearing for differential movement, a bisectional tool shaft supported in said movable frame, sets of cultivator tools each carried on a respective section of the tool shaft, and operative connections between respective sections of the differential shaft and respective sections of the tool shaft.

3. An engine driven rotary cultivator including a main frame supported to remain at a fixed distance from the ground, a movable secondary frame carried by the main frame and supported thereby to permit relative movement toward and from the ground, an engine driven drive shaft, a differential gearing driven by said drive shaft and carried by said secondary frame, a sectional differential shaft driven by said gearing and having its sections connected to the gearing for differential movement, a bisectional tool shaft supported in said movable frame, sets of cultivator tools each carried on a respective section of the tool shaft, operative connections between respective sections of the differential shaft and respective sections of the tool shaft, and means carried by the main frame and connected to the movable frame for altering the position of the latter with respect to the ground.

4. An engine driven rotary cultivator including a main frame supported to remain at a fixed distance from the ground, a movable secondary frame carried by the main frame and supported thereby to permit relative movement toward and from the ground, an engine driven drive shaft, a differential gearing driven by said drive shaft and carried by said secondary frame, a sectional differential shaft driven by said gearing and having its sections connected to the gearing for differential movement, a bisectional tool shaft supported in said movable frame, sets of cultivator tools each carried on a respective section of the tool shaft, operative connections between respective sections of the differential shaft and respective sections of the tool shaft, a vertical guide supported by said main frame, a ratchet bar slidable in said guide, a lever pivoted adjacent said guide and carrying a pawl engaging the ratchet bar, and a flexible connection between the ratchet bar and movable frame.

5. An engine driven rotary cultivator including a main frame supported to remain at a fixed distance from the ground, a secondary frame pivoted at its forward end to the main frame to swing in a vertical arc, an engine driven drive shaft, a sectional differential shaft driven by said gearing and having its sections connected to the gearing for differential movement, a bisectional tool shaft journaled at the rear of said secondary frame, sets of cultivator tools each carried on a respective section of the tool shaft, operative connections between respective sections of the differential shaft and respective sections of the tool shaft, and means carried by the main frame and connected to the secondary frame for raising and lowering the rear end of the latter.

6. An engine driven rotary cultivator including a main frame supported to remain at a fixed distance from the ground, a secondary frame pivoted at its forward end to the main frame to swing in a vertical arc, an engine driven drive shaft, a sectional differential shaft driven by said gearing and having its sections connected to the gearing for differential movement, a bisectional tool shaft journaled at the rear of said secondary frame, sets of cultivator tools each carried on a respective section of the tool shaft, operative connections between respective sections of the differential shaft and respective sections of the tool shaft, a vertical guide supported by said main frame, a ratchet bar slidable in said guide, a lever pivoted on said main frame adjacent said guide and carrying a pawl engaging said ratchet bar, and a flexible connection between the ratchet bar and the rear portion of the secondary frame.

In testimony whereof I have signed my name to this specification.

DINES CHRISTIAN PEDERSEN.